United States Patent
Hamagishi

(10) Patent No.: US 9,508,182 B2
(45) Date of Patent: Nov. 29, 2016

(54) METHOD OF DISPLAYING 3D IMAGE AND DISPLAY APPARATUS FOR PERFORMING THE METHOD

(71) Applicant: SAMSUNG DISPLAY CO., LTD., Yongin, Gyeonggi-Do (KR)

(72) Inventor: Goro Hamagishi, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 542 days.

(21) Appl. No.: 13/693,818

(22) Filed: Dec. 4, 2012

(65) Prior Publication Data

US 2013/0176299 A1 Jul. 11, 2013

(30) Foreign Application Priority Data

Jan. 5, 2012 (KR) .................. 10-2012-0001352

(51) Int. Cl.
- *G06T 15/00* (2011.01)
- *H04N 13/00* (2006.01)
- *H04N 13/04* (2006.01)

(52) U.S. Cl.
CPC .............. *G06T 15/00* (2013.01); *H04N 13/00* (2013.01); *H04N 13/045* (2013.01); *H04N 13/0413* (2013.01); *H04N 13/0415* (2013.01)

(58) Field of Classification Search
None
See application file for complete search history.

(56) References Cited

U.S. PATENT DOCUMENTS

| | | | |
|---|---|---|---|
| 7,245,430 B2 | 7/2007 | Kobayashi et al. | |
| 7,623,188 B2 | 11/2009 | Hamagishi | |
| 7,826,136 B2 | 11/2010 | Koo et al. | |
| 7,969,463 B2 | 6/2011 | Takaki | |
| 8,248,406 B2 | 8/2012 | Uehara et al. | |
| 8,325,108 B2 | 12/2012 | Min et al. | |
| 8,384,772 B2 | 2/2013 | Saishu et al. | |
| 8,681,174 B2 | 3/2014 | Nam et al. | |
| 2005/0099688 A1* | 5/2005 | Uehara et al. | ................ 359/462 |
| 2007/0058113 A1 | 3/2007 | Wu et al. | |
| 2007/0146845 A1 | 6/2007 | Hirabara et al. | |

(Continued)

FOREIGN PATENT DOCUMENTS

| | | |
|---|---|---|
| CN | 1525212 | 9/2004 |
| CN | 1614505 | 5/2005 |

(Continued)

OTHER PUBLICATIONS

English Abstract for Publication No. 10-0728777.

(Continued)

*Primary Examiner* — Michelle Chin
(74) *Attorney, Agent, or Firm* — F. Chau & Associates, LLC

(57) ABSTRACT

A display apparatus includes a display panel and an active parallax barrier panel. The display panel displays n numbers of viewpoint images on a display panel ('n' is natural numbers greater than 2). The active parallax barrier panel includes a plurality of barrier units. Each of the barrier units includes an opening portion and a blocking area divided into m numbers of sub-areas. The active parallax barrier panel selectively opens the m numbers of sub-areas to exit the m numbers of viewpoint images on (n×m) numbers of viewpoint positions ('m' is natural numbers greater than 2). Thus, an active parallax barrier panel is time-division driven to display multi-viewpoint images. Moreover, a pixel structure and a barrier structure are alerted, so that deterioration of a resolution of a 3D image may be minimized.

19 Claims, 9 Drawing Sheets

(56) References Cited

U.S. PATENT DOCUMENTS

| | | | | |
|---|---|---|---|---|
| 2008/0037120 | A1* | 2/2008 | Koo et al. | 359/463 |
| 2008/0079662 | A1* | 4/2008 | Saishu et al. | 345/55 |
| 2008/0278639 | A1* | 11/2008 | Hamagishi | 349/8 |
| 2009/0141122 | A1 | 6/2009 | Hong | |
| 2010/0046069 | A1* | 2/2010 | Otte et al. | 359/462 |
| 2011/0234929 | A1* | 9/2011 | Lin | G02B 27/2214 349/15 |
| 2012/0001956 | A1* | 1/2012 | Sato | 345/690 |
| 2012/0044567 | A1 | 2/2012 | Uehara et al. | |
| 2013/0058563 | A1 | 3/2013 | Yoshida | |

FOREIGN PATENT DOCUMENTS

| | | |
|---|---|---|
| CN | 101123735 | 2/2008 |
| CN | 101303456 | 11/2008 |
| CN | 101803393 | 8/2010 |
| EP | 2403256 | 1/2012 |
| JP | 2004280052 * | 7/2004 |
| JP | 2005-223727 | 8/2005 |
| JP | 2008-58583 | 3/2008 |
| JP | 2008-67092 | 3/2008 |
| JP | 2008-102430 | 5/2008 |
| JP | 2011-18049 | 1/2011 |
| JP | 2011-101366 | 5/2011 |
| JP | 2011-188142 | 9/2011 |
| KR | 10-0728777 | 6/2007 |
| KR | 10-0841321 | 6/2008 |
| WO | WO2005-093494 | 10/2005 |

OTHER PUBLICATIONS

English Abstract for Publication No. 10-0841321.
Japanese Office Action Dated Mar. 28, 2016.

* cited by examiner

METHOD OF DISPLAYING 3D IMAGE AND DISPLAY APPARATUS FOR PERFORMING THE METHOD

CROSS-REFERENCE TO RELATED APPLICATIONS

This application claims priority under 35 U.S.C. §119 to Korean Patent Application No. 10-2012-0001352, filed on Jan. 5, 2012 in the Korean Intellectual Property Office (KIPO), the contents of which are herein incorporated by reference in their entirety.

TECHNICAL FIELD

Exemplary embodiments of the present invention relate to a method of displaying a three-dimensional ("3D") image and a display apparatus for performing the method. More particularly, exemplary embodiments of the present invention relate to a method of displaying 3D image which capable of enhancing a display quality of the 3D image and a display apparatus for performing the method.

DISCUSSION OF THE RELATED ART

Generally, a display apparatus is capable of displaying two-dimensional images (hereinafter, referred to as 2D images). Recently, according to increasing demands for the display of three-dimensional images (hereinafter, referred to as a 3D images) in fields of games, movies and so on, display apparatuses for displaying 3D images have been developed. The display devices for displaying 3D images provide distinct 2D images for the left and right eyes of the observer. The observer's brain mixes the distinct left-eye and right-eye 2D images and the 3D images may be perceived.

The distinct left-eye and right-eye 2D images that make up the 3D image are each rendered or filmed from a slightly different angle designed to match the naturally occurring phenomenon of binocular parallax by which human site is able to precieve depth by relying upon the space between the human eyes to see real objects from two slightly different angles. Accordingly, the 3D display apparatus provides a stereoscopic image that relies upon the binocular parallax of the observer to produce the 3D perception.

There are two types of 3D image display apparatus using the binocular parallax. There is a stereoscopic type display apparatus that relies upon 3D glasses worn by the observer and an autostereoscopic type display apparatus that does not require the use of 3D glasses. The stereoscopic type display apparatus may be divided into an anaglyph type display apparatus, a shutter glasses type display apparatus, etc. In the anaglyph type display apparatus, the pair of 3D glasses have a blue lens and a red lens. In the shutter glasses type display apparatus, a left-eye image and a right-eye image are temporally divided to be displayed thereon in a period, and the pair of 3D glasses in which a left-eye shutter and a right-eye shutter are closed and opened in synchronized with the period is used.

The autostereoscopic type display apparatus may be divided into a lens type, a barrier type, etc. The lens type display apparatus includes a lens panel disposed on a display panel. The lens panel refracts a 3D image displayed on the display panel to plural viewpoints to display a 3D image. The barrier type display apparatus includes an active parallax barrier panel disposed on a display panel. The active parallax bather panel serves to block the observer's left eye from seeing sections of the display apparatus that display images intended for the right eye while blocking the observer's right eye from seeing sections of the display apparatus that display images intended for the left eye. As a result of this structure, there are a finite number of distinct angles that the image may be viewed from through the parallax barrier or the lense arrangement. These distinct angles by which the 3D image may be viewed from are referred to as viewpoints.

As the lenses of the lense-type display and the barrier of the parallax barrier-type displays have traditionally been physically attached to the display apparatus such that they are not removable, the lenses and/or barriers may therefore interfere with the use of the display apparatus in displaying 2D images.

SUMMARY

Examplary embodiments of the present invention provide to a method of displaying 3D images with an increased number of viewpoints and reduced deterioration of a display resolution.

Examplary embodiments of the present invention provide a display apparatus for performing the above-mentioned method.

According to one aspect of the present invention, there is provided a method of displaying a three-dimensional ("3D") image. In the method, n numbers of viewpoint images are displayed on a display panel (where 'n' is natural numbers greater than 2). During one frame interval, m numbers of sub-areas of an opening portion of a barrier unit are selectively opened to provide m numbers of viewpoint images on n×m viewpoint positions (where 'in' is natural numbers greater than 2).

In an exemplary embodiment of the present invention, the display panel may include a pixel unit including a plurality of color subpixels. Here, the opening portion may be substantially smaller than a pitch 'p' of the color subpixel and each of the sub-areas may correspond to p/m.

In an exemplary embodiment of the present invention, the display panel may include a pixel unit including a plurality of color subpixels. Here, the color subpixels may be identical to each other and may be arranged in a first angle with respect to a row direction.

In an exemplary embodiment of the present invention, the opening portion may be arranged in a second angle opposite to a horizontal direction with respect to the first angle.

In an exemplary embodiment of the present invention, the display panel may display four viewpoint images through four color subpixels that are continuously disposed along a column direction.

In an exemplary embodiment of the present invention, opening portions of the barrier unit may be arranged in a delta shape to display five viewpoint images.

In an exemplary embodiment of the present invention, the display panel may include a pixel unit including a plurality of color subpixels. Here, the color subpixels may be identical to each other and may be arranged along a row direction.

In an exemplary embodiment of the present invention, six viewpoint images may be displayed on six color subpixels that are continuously disposed along a column direction.

In an exemplary embodiment of the present invention, seven viewpoint images may be displayed on seven color subpixels that are continuously disposed along a column direction.

According to an aspect of the present invention, a display apparatus includes a display panel and an active parallax barrier panel. The display panel displays n numbers of viewpoint images on a display panel (where 'n' is natural numbers greater than 2). The active parallax barrier panel includes a plurality of barrier units. Each of the barrier units includes an opening portion and a blocking area divided into m numbers of sub-areas (where 'm' is natural numbers greater than 2). The active parallax barrier panel selectively opens the m numbers of sub-areas to provide the m numbers of viewpoint images on (n×m) numbers of viewpoint positions.

In an exemplary embodiment of the present invention, the display panel may include a pixel unit including a plurality of color subpixels. Here, the opening portion may be substantially smaller than a pitch 'p' of the color subpixel. Each of the sub-areas corresponds to p/m.

In an exemplary embodiment of the present invention, the display panel may include a pixel unit including a plurality of color subpixels. Here, n numbers of viewpoint images may be displayed on n numbers of color subpixels that are continuously disposed along a column direction.

In an exemplary embodiment of the present invention, the display panel may include a pixel unit including a plurality of color subpixels. Here, the color subpixels may be identical to each other and may be arranged in a first angle with respect to a row direction.

In an exemplary embodiment of the present invention, the opening portion of the active parallax barrier panel may be arranged in a second angle with respect to a row direction.

In an exemplary embodiment of the present invention, the second angle may be opposite to the first angle with respect to a horizontal direction.

In an exemplary embodiment of the present invention, the display panel may display four sub-viewpoint images through four color subpixels that are continuously disposed along a column direction.

In an exemplary embodiment of the present invention, the opening portions of the active parallax barrier panel may be arranged in a delta shape to display five viewpoint images.

In an exemplary embodiment of the present invention, the display panel may include a pixel unit including a plurality of color subpixels. Here, the color subpixels may be identical to each other and may be arranged along a row direction.

In an exemplary embodiment of the present invention, six viewpoint images may be displayed on six color subpixels that are continuously disposed along a column direction.

In an exemplary embodiment of the present invention, seven viewpoint images may be displayed on seven color subpixels that are continuously disposed along a column direction.

According to an aspect of the present invention, a display apparatus includes a display panel displaying more than two distinct viewpoint images. A display driving part drives the display panel. An active parallax barrier panel includes a plurality of barrier units, each of the barrier units including an opening portion and a blocking area divided into a plurality of sub-areas. The active parallax barrier panel is configured to selectively open each of the plurality of sub-areas to provide the more than two distinct viewpoint images to provide more than two distinct viewpoint positions for displaying a three-dimensional image. A barrier driving part drives the active parallax barrier panel According to some exemplary embodiments of the present invention, an active parallax barrier panel is time-division driven to display multi-viewpoint images. Moreover, a pixel structure and a barrier structure are alerted so that deterioration of a resolution of a 3D image may be minimized.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION

Hereinafter, exemplary embodiments of the present invention will be explained in detail with reference to the accompanying drawings.

Figure 1:
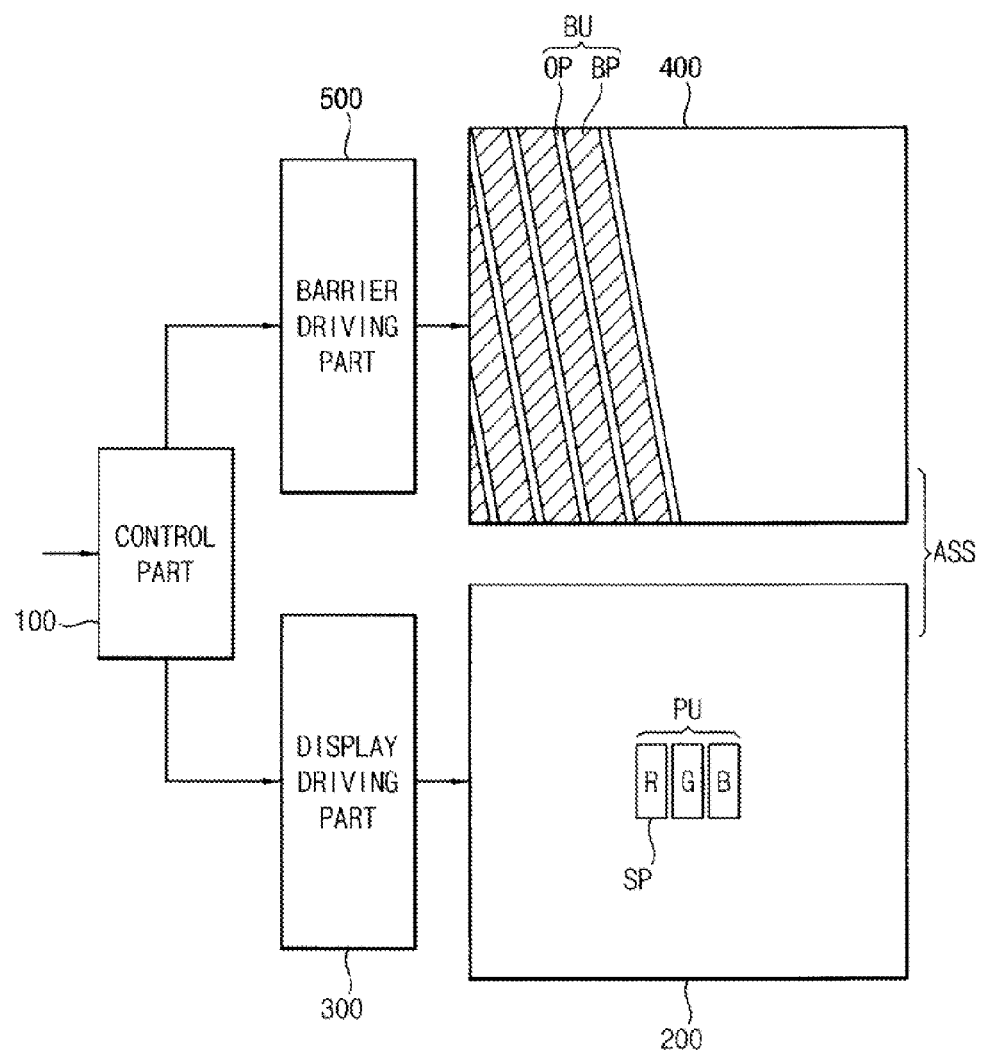
FIG. 1 is a block diagram schematically illustrating a display apparatus according to an exemplary embodiment of the present invention.

FIG. 1 is a block diagram schematically illustrating a display apparatus according to an exemplary embodiment of the present invention.

Referring to FIG. 1, the display apparatus includes a control part 100, a display driving part 300, a barrier driving part 500 and a panel assembly ASS. The panel assembly ASS includes a display panel 200 and an active parallax barrier panel 400.

The control part 100 receives 2D image data and 3D image data, and controls elements of the display apparatus in a 2D image mode or a 3D image mode based on the received image data.

When in the 2D image mode, the control part 100 drives the active parallax barrier panel 400 as a transmitting panel in order to provide a 2D image displayed on the display panel 200. When in the 3D image mode, the control part 100 drives the active parallax barrier panel 400 in a time-division manner to have a driving frequency of m times the frequency of the display panel 200, so that n numbers of viewpoint images displayed on the display panel 200 are provided to (n×m) numbers of viewpoint positions ('n' and 'm' are natural numbers). Thus, when in the 3D image mode, the display apparatus may display (n×m) numbers of viewpoint images.

The display driving part 300 drives the display panel 200 in accordance with a control of the control part 100. The display driving part 300 may include a data driving part for driving a data line and a gate driving part for driving a gate line.

The display panel 200 includes a plurality of data lines, a plurality of gate lines, and a plurality of subpixels SP. The subpixels SP may be arranged in a matrix shape including a plurality of pixel rows and a plurality of pixel columns. Each of the subpixels SP may include a switching element connected to the data line and the gate line and a pixel electrode connected to the switching element. The display panel 200 may include a plurality of pixel units PU including at least one subpixel SP. For example, the pixel unit PU may include a red subpixel R, a green subpixel G and a blue subpixel B.

When in the 3D image mode, the barrier driving part 500 drives the active parallax barrier panel 400 in a time-division driving manner of m time speed in accordance with a control of the control part 100. For example, when the active parallax barrier panel 400 is time-division driven in a double speed that is twice as fast as the speed of the display panel 200, n numbers of viewpoint images are provided to n numbers of first viewpoint positions during a first interval of the unit frame interval. In addition, n numbers of viewpoint images are provided to n numbers of a second viewpoint positions adjacent to the first viewpoint positions during a second interval of the unit frame interval. Thus, the barrier driving part 500 provides n numbers of viewpoint images to (n×2) numbers of viewpoint positions.

The active parallax barrier panel 400 may include a first substrate, a second substrate and a liquid crystal layer. The first substrate includes a plurality of barrier electrodes for forming the barrier unit BU. The second substrate includes an opposition electrode opposite to the barrier electrode. The liquid crystal layer forms the barrier unit BU including an opening portion OP transmitting lights and a blocking portion BP blocking lights in response to a voltage applied to the barrier electrode and the opposition electrode. The opening portion OP is divided into m numbers of sub-areas. The m numbers of sub-areas are selectively opened in accordance with a time-division driving of m times the frequency of the display panel. The opening portions OP may have an incline structure in which the sub-areas are arranged at an angle with respect to a row direction and a delta shape in which the sub-areas are arranged in a delta shape.

Figure 2:
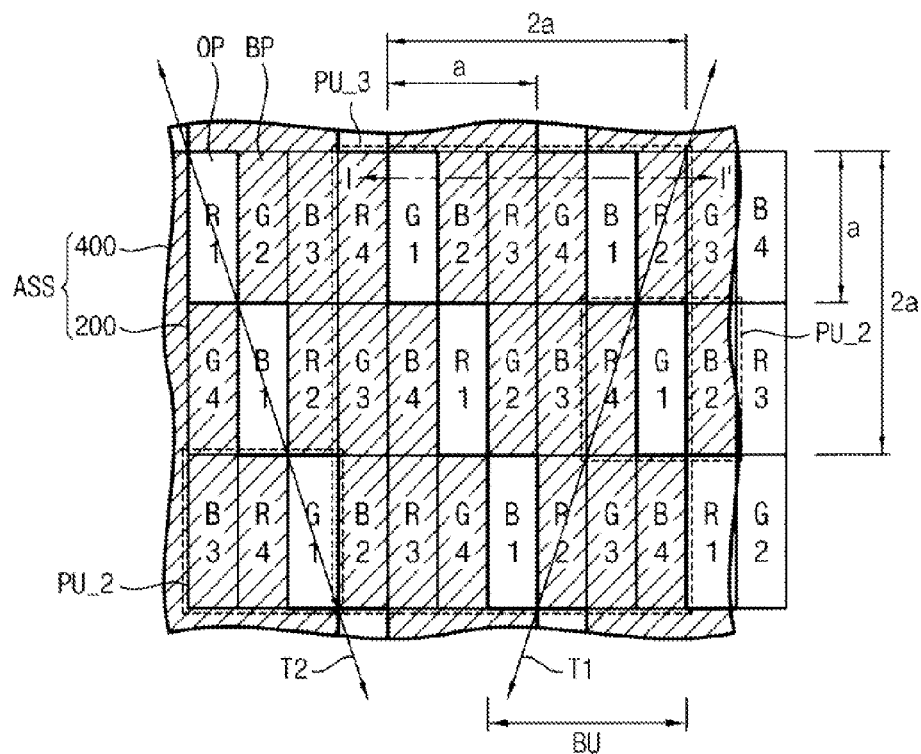
FIG. 2 is a plan view schematically illustrating a panel assembly of FIG. 1.

FIG. 2 is a plan view schematically illustrating a panel assembly of FIG. 1.

Referring to FIGS. 1 and 2, the display panel 200 includes a red subpixel R, a green subpixel G and a blue subpixel B to display four viewpoint images 1, 2, 3 and 4.

The color subpixels R, G and B are repeatedly arranged along a column direction, and are repeatedly arranged along a row direction. As shown in FIG. 2, the color subpixels identical to each other are arranged in a first angle with respect to a row direction T1. Four numbers of viewpoint images 1, 2, 3 and 4 are displayed on four numbers of color subpixels that are continuously disposed along a column direction. The opening portion OP is extended in a second angle T2 opposite to the first angle T1 with respect to a horizontal direction. The opening portions OP are arranged along a column direction. For example, the active parallax barrier panel 400 has an incline structure.

The active parallax barrier panel 400 defines a barrier unit BU. The bather unit BU includes an opening portion OP and a blocking portion BP.

For example, in the barrier unit BU defined in a first pixel column, the opening portion OP is disposed in correspondence with a green subpixel G displaying a first viewpoint image 1, and the blocking portion BP is disposed in correspondence with blue, red and green subpixels B, R and G that are continuously disposed along a column direction, which display a second viewpoint images 2, a third viewpoint image 3 and a fourth viewpoint image 4, respectively. In the barrier unit BU defined in a second pixel column, the opening portion OP is disposed in correspondence with a red subpixel R displaying a first viewpoint image 1. The blocking portion BP is disposed in correspondence with green, blue and red subpixels G, B and R that are continuously disposed along a column direction, which display a second viewpoint images 2, a third viewpoint image 3 and a fourth viewpoint image 4, respectively. In the barrier unit BU defined in a third pixel column, the opening portion OP is disposed in correspondence with a blue subpixel B displaying a first viewpoint image 1. The blocking portion BP is disposed in correspondence with red, green and blue subpixels R, G and B that are continuously disposed along a column direction, which display a second viewpoint images 2, a third viewpoint image 3 and a fourth viewpoint image 4, respectively.

According to the display assembly ASS of an exemplary embodiment, when in a 2D image mode, a 2D pixel unit PU_2 corresponding to a pixel unit including red, green and blue subpixels R, G and B displays a 2D image having a resolution of M×N (where M and N are a natural number).

When in a 3D image mode, a 3D pixel unit PU_3, which includes red, green and blue subpixels R, G and B displaying identical viewpoint image exposed through the opening portion OP of the barrier unit BU, displays a 3D image having a resolution of (M/2)×(N/2).

According to an exemplary embodiment, a resolution of the 3D image is decreased about ½ with respect to a resolution of the 2D image in a horizontal direction and a vertical direction.

Figure 3:
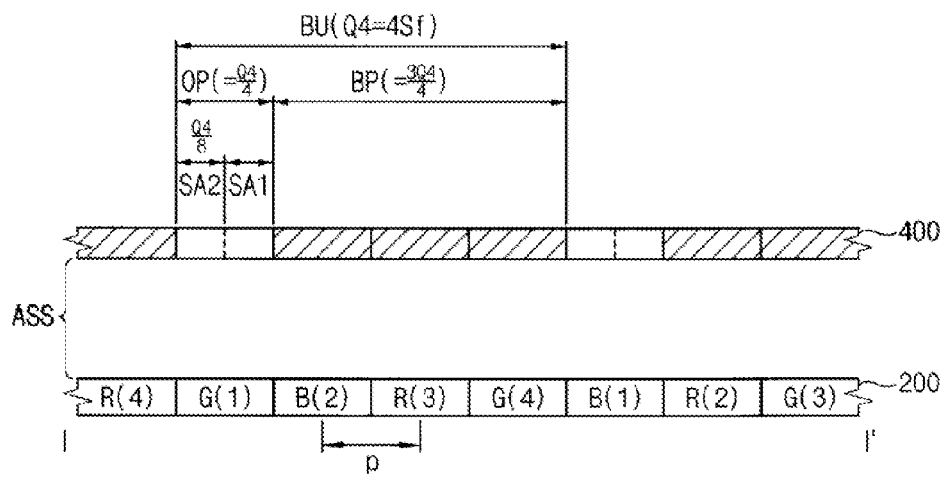
FIG. 3 is a cross-sectional view taken along a line I-I' of FIG. 2.
Figure 4:
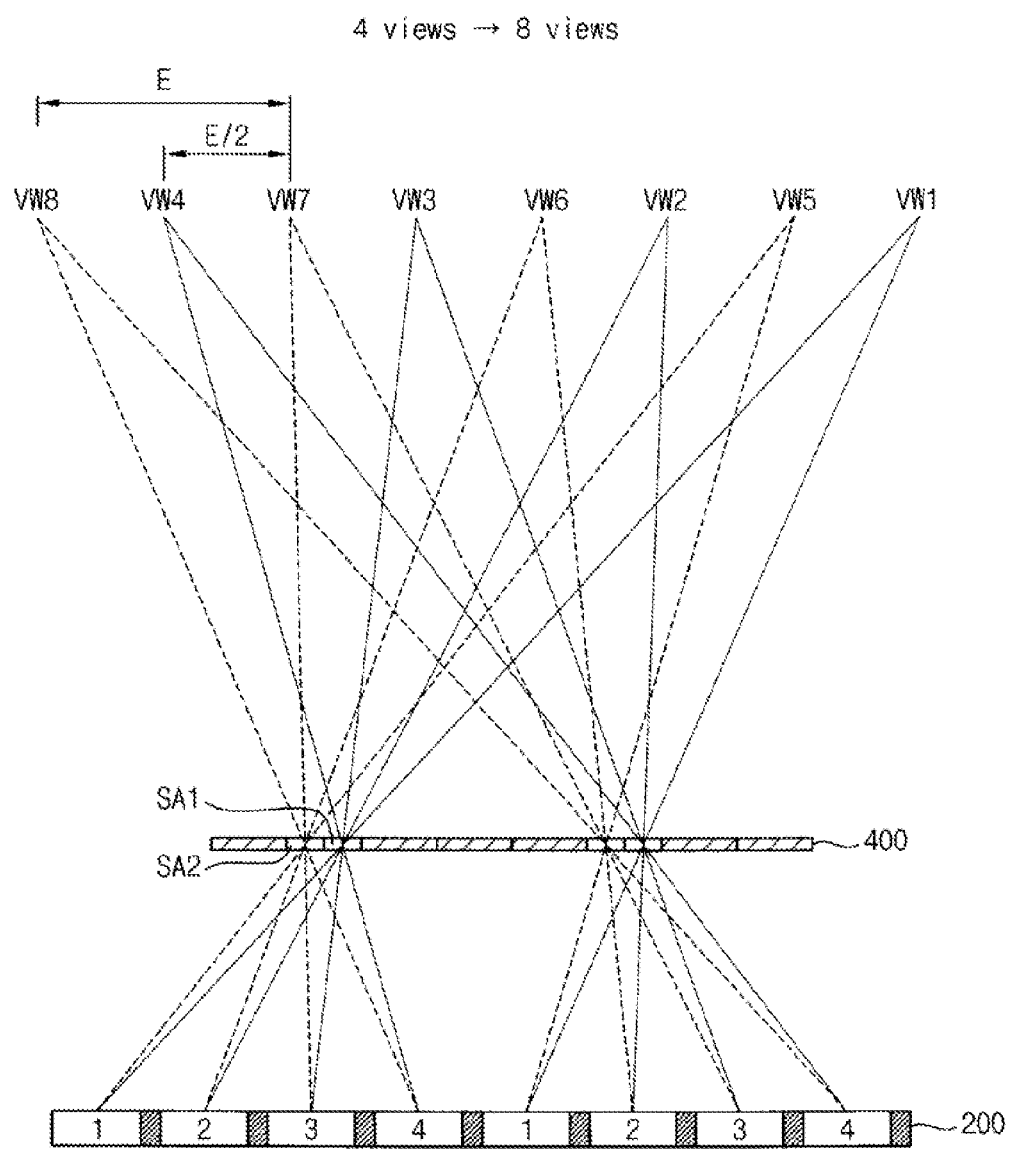
FIG. 4 is a concept diagram schematically illustrating a method of driving a multi-viewpoint image of a panel assembly of FIG. 1.

FIG. 3 is a cross-sectional view taken along a line I-I' of FIG. 2. FIG. 4 is a concept diagram schematically illustrating a method of driving a multi-viewpoint image of a panel assembly of FIG. 1.

Referring to FIGS. 3 and 4, the active parallax barrier panel 400 includes a plurality of barrier units BU. The barrier unit BU includes an opening portion OP and a blocking portion BP.

The barrier unit BU has a barrier unit width (Q4=4 Sf) corresponding to four numbers of color subpixels.

For example, when the active parallax barrier panel 400 is disposed on the display panel 200, Sf may be determined by the following Equation 1.

$$Df:Sf=(Df+df):p \qquad \text{Equation 1}$$

In Equation 1, 'Df' represents a distance between the active parallax barrier panel 400 and eyes of an observer, 'df' represents a distance between the display panel and the active parallax barrier panel 400, and 'p' represents a pitch of a subpixel.

Alternatively, when the active parallax barrier panel 400 is disposed below the display panel 200, Sf may be determined by the following Equation 2.

$$Db:p(Db+db):Sf \qquad \text{Equation 2}$$

In Equation 2, 'Db' represents a distance between the display panel 200 and eyes of an observer, 'db' represents a distance between the display panel and the active parallax barrier panel 400, and 'p' represents a pitch of a subpixel.

The opening portion OP may have a width Q4/4 corresponding to one color subpixel and the blocking portion BP may have a width 3Q4/4 corresponding to three color subpixels. The opening portion OP may have a first sub-area SA1 and a second sub-area SA2. Each of the first and second sub-areas SA1 and SA2 may have a width Q4/8 corresponding to a half of the color subpixel SP. According to Equations 1 and 2, the opening portion OP may be smaller than a pitch 'p' of the subpixel.

In the 3D image mode, the opening portion OP of the active parallax barrier panel 400 is time-division driven, so that the first and second sub-areas SA1 and SA2 are selectively opened during one frame interval.

For example, during a first interval of one frame interval, the first sub-area SA1 is operated as the opening portion OP, and the second sub-area SA2 is included in the blocking portion BP. Thus, the first, second, third and fourth viewpoint images 1, 2, 3 and 4 are displayed on the display panel 200 and are provided to the first, second, third and fourth viewpoint positions VW1, VW2, VW3 and VW4 through the opening portion OP corresponding to the first sub-area SA1. Accordingly, during the first interval, two viewers may view a 3D image.

Then, during a second interval of the frame interval, the first sub-area SA1 is included in the blocking portion BP and the second sub-area SA2 is operated as the opening portion OP. Thus, first, second, third and fourth viewpoint images 1, 2, 3 and 4 displayed on the display panel 200 are provided to fifth, sixth, seventh and eighth viewpoint positions VW5, VW6, VW7 and VW8 through the opening portion OP corresponding to the second sub-area SA2. Accordingly, during the second interval, two viewers may view a 3D image.

As a result, the display assembly ASS may display eight viewpoint images during one frame interval, and four viewers may view 3D image.

Figure 5A:
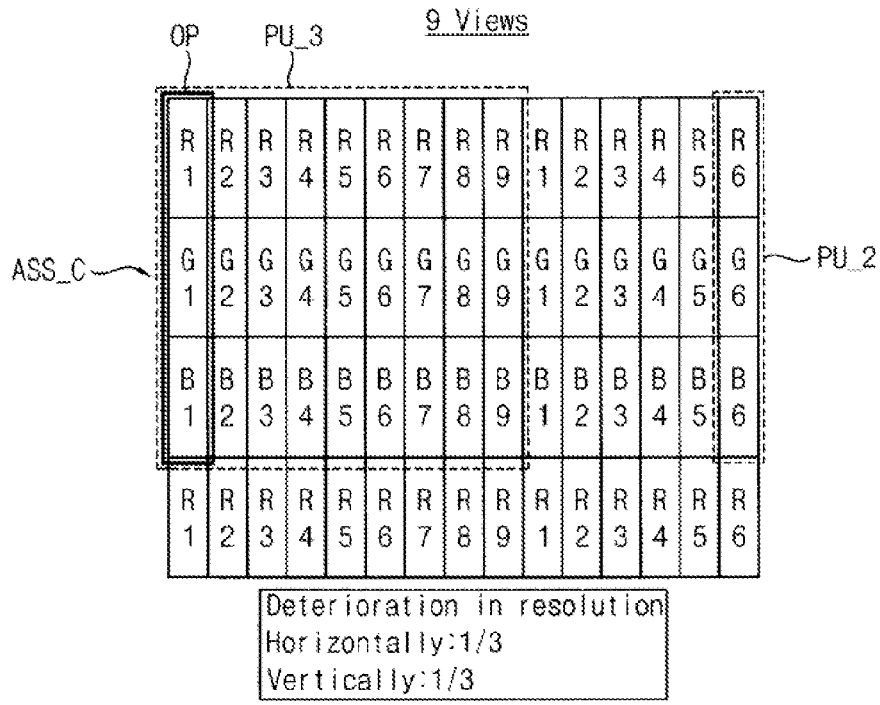
FIGS. 5A and 5B are concept diagrams explaining a resolution according to exemplary embodiments of the present invention.
Figure 5B:
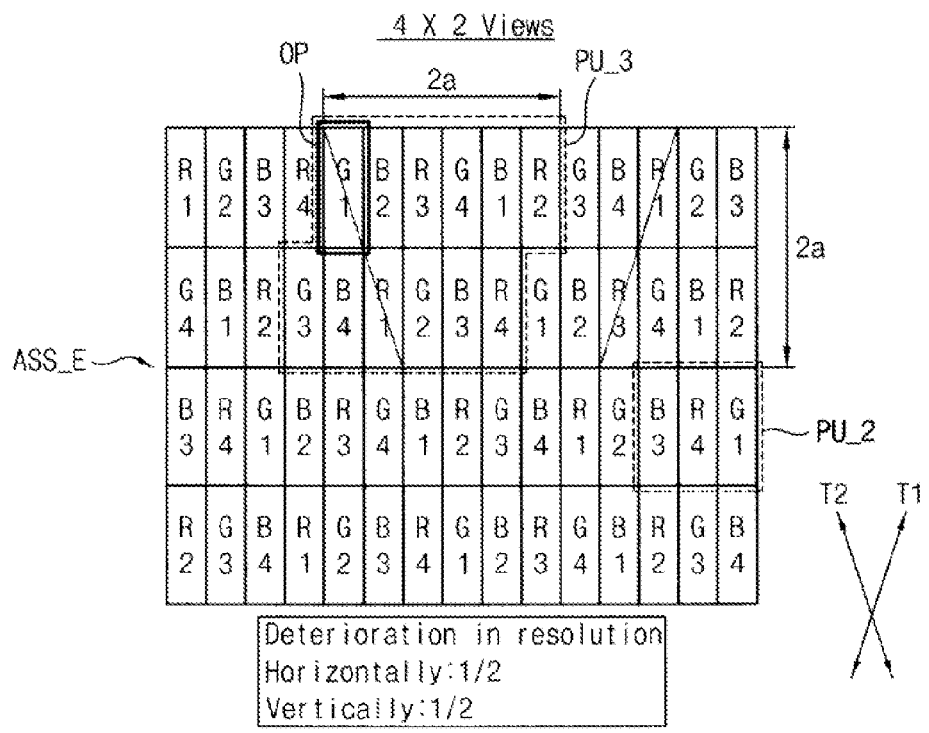

FIGS. 5A and 5B are concept diagrams explaining a resolution according to exemplary embodiments of the present invention. FIG. 5A is a plan view schematically illustrating a display assembly according to an exemplary embodiment, and FIG. 5B is a plan view schematically illustrating a display assembly according to an exemplary embodiment.

Referring to FIG. 5A, a display assembly ASS_C according to an exemplary embodiment includes a red subpixel R, a green subpixel G and a blue subpixel B. In a 3D image mode, the display assembly ASS_C displays nine viewpoint images 1, 2, 3, 4, 5, 6, 7, 8 and 9 on nine color subpixels that are continuously disposed along a column direction.

In a display panel of the display assembly ASS_C, identical color subpixels are arranged along a column direction, and a red subpixel R, a green subpixel G and a blue subpixel B are alternately arranged along a row direction. Thus, a 2D pixel unit PU_2 corresponding to a 2D image displayed on the display assembly ASS_C includes subpixels R, G and B of 1×3 matrix shape arranged along a row direction.

A barrier unit BU_C of a stripe structure, which is extended along a vertical direction in case of a 3D image mode, is formed on an active parallax barrier panel of the display panel ASS_C. The barrier unit BU_C includes an opening portion OP and a blocking portion BP. The barrier unit BU_C is disposed in correspondence with nine color subpixels, the opening portion OP is disposed in correspondence with one color subpixel, and the blocking portion BP is disposed in correspondence with eight color subpixels. Thus, a 3D pixel unit PU_3 corresponding to a 3D image displayed on the display assembly ASS_C includes subpixels R, G and B of 9×3 structure.

The display assembly ASS_C of FIG. 5A displays nine viewpoint images in a 3D image mode. The display assembly ASS_C of FIG. 5A displays a 3D image having a resolution decreased about ⅓ in comparison with a resolution of a 2D image.

Referring to FIG. 5B, a display assembly ASS_E according to an exemplary embodiment includes a red subpixel R, a green subpixel G and a blue subpixel B. As shown in FIG. 5B, the color subpixels R, G and B identical to each other are arranged in a first incline direction T1 with respect to a row direction. The display assembly ASS_E may display four viewpoint images before the display assembly ASS_E is time-division driven. When the display assembly ASS_E is time-division driven in a double speed, the display assembly ASS_E may display eight viewpoint images.

In a display panel of the display assembly ASS_E, a red subpixel R, a green subpixel G and a blue subpixel B are alternately arranged along a row direction. Thus, a 2D pixel unit PU_2 corresponding to a 2D image displayed on the display assembly ASS_E includes subpixels R, G and B of 3×1 matrix shape arranged along a row direction.

Moreover, a barrier unit BU_E extended in a second incline direction T2 opposite to the first incline direction T1 in a horizontal direction is formed on an active parallax barrier panel of the display assembly ASS_C. The barrier unit BU_E includes an opening portion OP and a blocking portion BP. The barrier unit BU_E is disposed in correspondence with four color subpixels, the opening portion OP is disposed in correspondence with one color subpixel, and the blocking portion BP is disposed in correspondence with three color subpixels. As shown in FIG. 4, the active parallax barrier panel of the display assembly ASS_E is time-division driven to display eight viewpoint images during one frame interval. Thus, a 3D pixel unit PU_3 corresponding to a 3D image displayed on the display assembly ASS_E includes subpixels R, G and B of 6×6 structure.

The display assembly ASS_E of the exemplary embodiment displays eight viewpoint images in a 3D image mode. The display assembly ASS_E of an exemplary embodiment displays a 3D image having a resolution decreased about ½ in comparison with a resolution of a 2D image.

As a result, it is determined that a resolution of a 3D image according to an exemplary embodiment is greater than a resolution of a 3D image of FIG. 5A.

Figure 6:
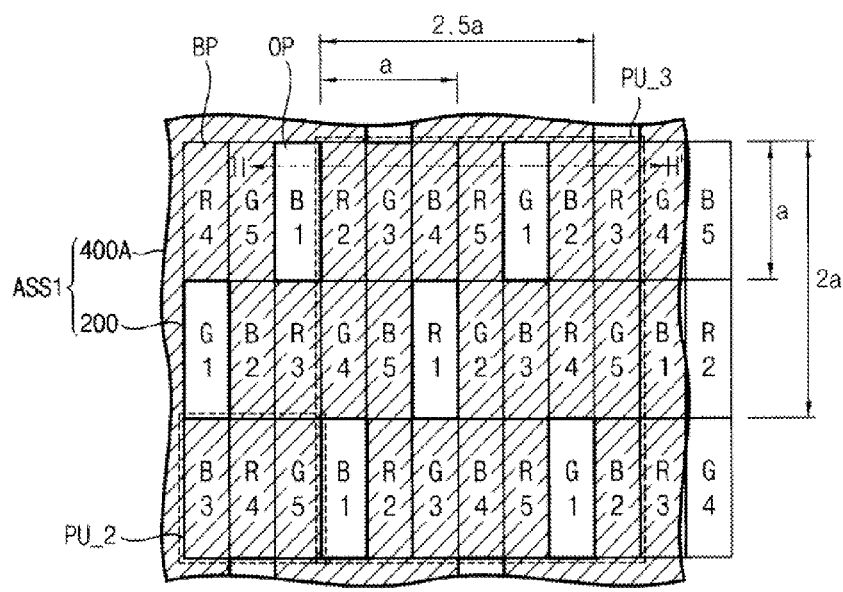
FIG. 6 is a plan view schematically illustrating a panel assembly according to an exemplary embodiment of the present invention.

FIG. 6 is a plan view schematically illustrating a panel assembly according to an exemplary embodiment of the present invention.

Referring to FIGS. 1 and 6, the display panel 200 of the panel assembly according to an exemplary embodiment includes a red subpixel R, a green subpixel G and a blue subpixel B to display five viewpoint images 1, 2, 3, 4 and 5.

The color subpixels R, G and B are repeatedly arranged along a column direction, and are repeatedly arranged along a row direction. As shown in FIG. 6, the color subpixels identical to each other are arranged in a first incline direction T1 with respect to a row direction. Five viewpoint images 1, 2, 3, 4 and 5 are displayed on five color subpixels that are continuously disposed along a column direction.

An active parallax barrier panel 400A according to an exemplary embodiment of the present invention includes a barrier unit BU. The barrier unit BU includes an opening portion OP and a blocking portion BP. The opening portion OP is arranged to have a delta 'Δ' shape that is a triangle shape. For example, the active parallax barrier panel 400A has a delta shape.

For example, the opening portion OP is disposed on the barrier unit BU defined in a first pixel column in correspondence with a blue subpixel B displaying a first viewpoint image '1', and the blocking portion BP is disposed on the barrier unit BU in correspondence with red, green, blue and red subpixels R, G, B and R respectively display second, third, fourth and fifth viewpoint images 2, 3, 4 and 5 continuously disposed along a column direction. The opening portion OP is disposed on the barrier unit BU defined in a second pixel column in correspondence with a red subpixel R displaying a first viewpoint image '1'. The blocking portion BP is disposed on the barrier unit BU in correspondence with green, blue, red and green subpixels G, B, R and G respectively display second, third, fourth and fifth viewpoint images 2, 3, 4 and 5 continuously disposed along a column direction.

When in a 2D image mode, the display assembly ASS1 according to an exemplary embodiment displays a 2D image having a resolution of M×N by a 2D pixel unit PU_2 corresponding to a pixel unit including red, green and blue subpixels. When in a 3D image mode, the display assembly ASS1 displays a 3D image having a resolution of M/2.5×N/2 by a 3D pixel unit PU_3 including red, green and blue subpixels R, G and B displaying identical viewpoint image through the opening portion OP of the barrier unit BU.

According to an exemplary embodiment, the 3D image has a resolution decreased about 1/2.5 in a horizontal direction and about ½ in a vertical direction with respect to a resolution of the 2D image.

Figure 7:
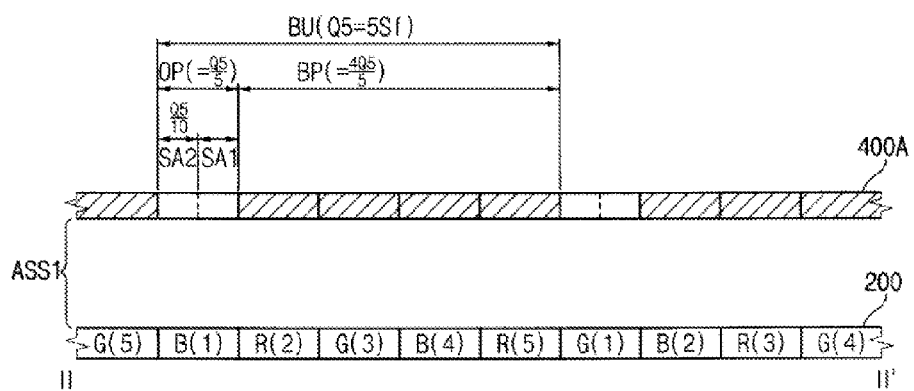
FIG. 7 is a cross-sectional view taken along a line II-II' of FIG. 6.
Figure 8:
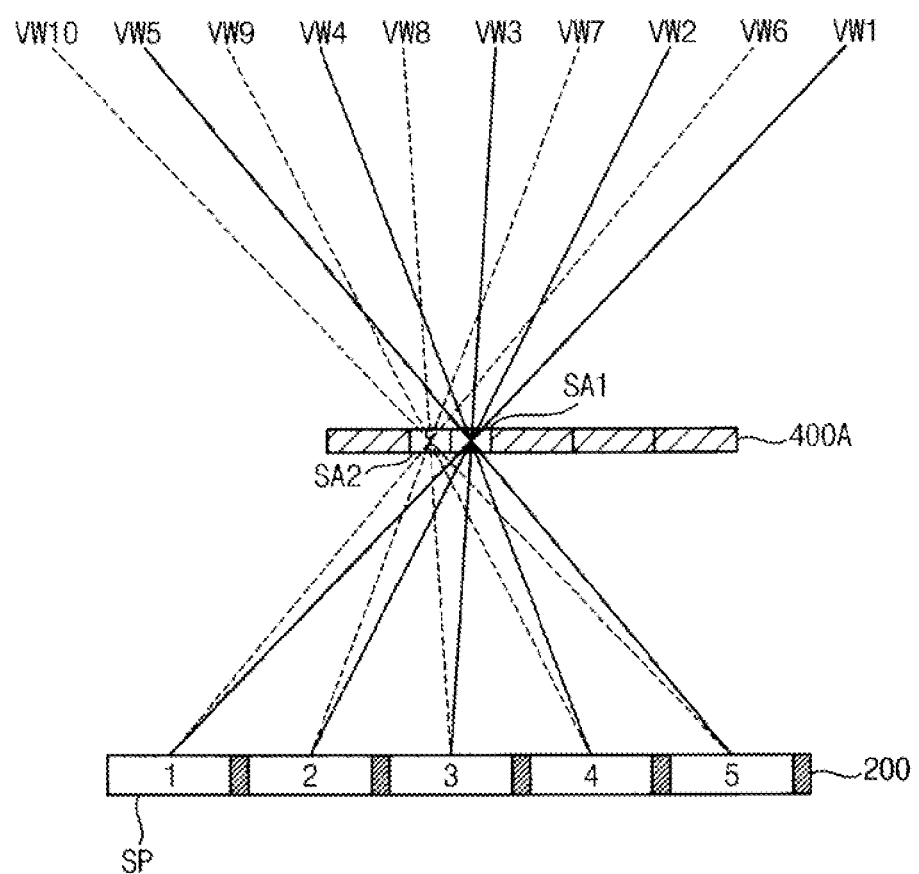
FIG. 8 is a concept diagram schematically illustrating a method of driving a multi-viewpoint image of a panel assembly of FIG. 6.

FIG. 7 is a cross-sectional view taken along a line II-II' of FIG. 6. FIG. 8 is a concept diagram schematically illustrating a method of driving a multi-viewpoint image of a panel assembly of FIG. 6.

Referring to FIGS. 6 and 7, the active parallax barrier panel 400A includes a plurality of barrier unit BU. The barrier unit BU includes an opening portion OP and a blocking portion BP.

The barrier unit BU has a barrier unit width corresponding five color subpixels (Q5=5Sf). The Sf may be defined by Equation 1 and Equation 2.

The opening portion OP may have a width Q5/5 corresponding to one color subpixel. The blocking portion BP may have a width 4Q5/5 corresponding to four color subpixels. The opening portion OP may have a first sub-area SA1 and a second sub-area SA2. Each of the first and second sub-areas SA1 and SA2 may have a width Q5/10 corresponding to a half of color subpixel SP.

When in the 3D image mode, the opening portion OP of the active parallax barrier panel 400A is time-division driven, so that the first and second sub-areas SA1 and SA2 are selectively opened during one frame interval.

For example, during a first interval of one frame interval, the first sub-area SA1 is operated as the opening portion OP, and the second sub-area SA2 is included in the blocking portion BP. Thus, the first, second, third, fourth and fifth viewpoint images 1, 2, 3, 4 and 5 displayed on the display panel 200 are provided to the first, second, third, fourth and fifth viewpoint positions VW1, VW2, VW3, VW4 and VW5 through the opening portion OP corresponding to the first sub-area SA1. Accordingly, during the first interval, more less than 2 viewers may view a 3D image.

Then, during a second interval of the frame interval, the first sub-area SA1 is included in the blocking portion BP, and the second sub-area SA2 is operated as the opening portion OP. Thus, first, second, third, fourth and fifth viewpoint images 1, 2, 3, 4 and 5 displayed on the display panel 200 are provided to sixth, seventh, eighth, ninth and tenth viewpoint positions VW6, VW7, VW8, VW9 and VW10 through the opening portion OP corresponding to the second sub-area SA2. Accordingly, during the second interval, more less than 2 viewers may view a 3D image.

As a result, the display assembly ASS1 may display ten viewpoint images during one frame interval, and five viewers may view 3D image.

According to an exemplary embodiment, a resolution of a 3D image may be decreased about ½ with respect to a resolution of a 2D image in a vertical direction, and may be decreased about ⅖ with respect to a resolution of a 2D image in a horizontal direction. Moreover, the active parallax barrier panel 400A for five viewpoints may be time-division driven to display ten viewpoint images.

Figure 9:
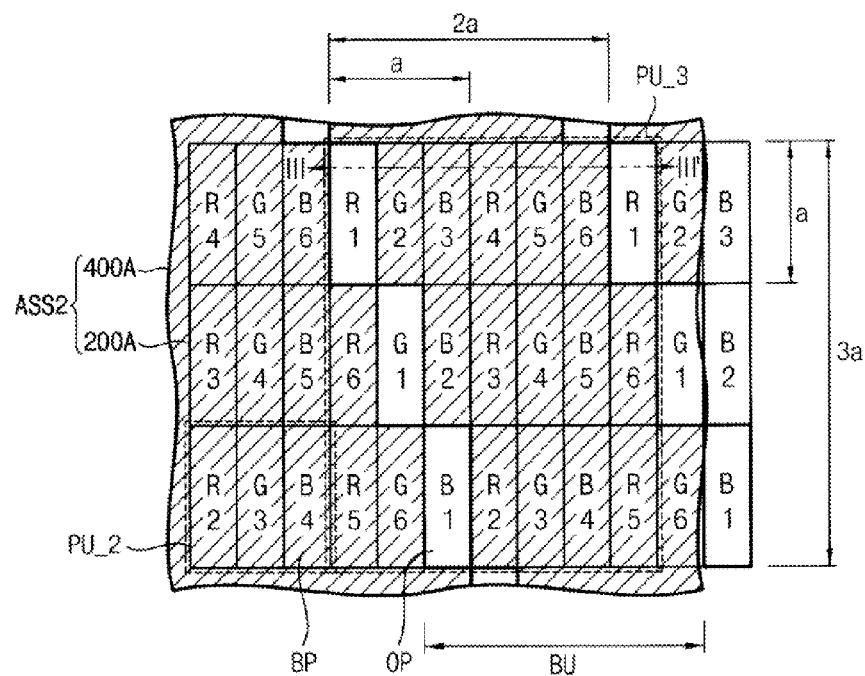
FIG. 9 is a plan view schematically illustrating a panel assembly according to an exemplary embodiment of the present invention.

FIG. 9 is a plan view schematically illustrating a panel assembly according to an exemplary embodiment of the present invention.

Referring to FIGS. 1 and 9, a panel assembly ASS2 according to an exemplary embodiment includes a red subpixel R, a green subpixel G and a blue subpixel B, to display six viewpoint images 1, 2, 3, 4, 5 and 6.

The color subpixels R, G and B are repeatedly arranged along a column direction, and are repeatedly arranged along a row direction. As shown in FIG. 9, sixth viewpoint images 1, 2, 3, 4, 5 and 6 are displayed on six color subpixels that are continuously disposed along a column direction.

The active parallax barrier panel 400B of the panel assembly ASS2 according an exemplary embodiment defines a barrier unit BU. The bather unit BU includes an opening portion OP and a blocking portion BP. The opening portion OP is arranged in an angle inclined with respect to a row direction. For example, the active parallax barrier panel 400B has an incline structure.

For example, in the barrier unit BU defined in a first pixel column, the opening portion OP is disposed in correspondence with a red subpixel R displaying a first viewpoint image 1. The blocking portion BP is disposed in correspondence with green, blue, red, green and blue subpixels G, B, R, G and B that are continuously disposed along a column direction, which display a second viewpoint images 2, a third viewpoint image 3, a fourth viewpoint image 4, a fifth viewpoint image 5 and a sixth viewpoint image 6, respectively. In the barrier unit BU defined in a second pixel column, the opening portion OP is disposed in correspondence with a green subpixel G displaying a first viewpoint image 1. The blocking portion BP is disposed in correspondence with blue, red, green, blue and red subpixels B, R, G, B and R that are continuously disposed along a column direction, which display a second viewpoint images 2, a third viewpoint image 3, a fourth viewpoint image 4, a fifth viewpoint image 5 and a sixth viewpoint image 6, respectively. In the bather unit BU defined in a third pixel column, the opening portion OP is disposed in correspondence with a blue subpixel B displaying a first viewpoint image 1. The blocking portion BP is disposed in correspondence with red, green, blue, red and green subpixels R, G, B, R and G that are continuously disposed along a column direction, which display a second viewpoint images 2, a third viewpoint image 3, a fourth viewpoint image 4, a fifth viewpoint image 5 and a sixth viewpoint image 6, respectively.

When in a 2D image mode, a 2D pixel unit PU_2 corresponding to a pixel unit including red, green and blue subpixels R, G and B displays a 2D image having a resolution of M×N (where M and N are a natural number).

When in a 3D image mode, a 3D pixel unit PU_3, which includes red, green and blue subpixels R, G and B displaying identical viewpoint image exposed through the opening portion OP of the barrier unit BU, displays a 3D image having a resolution of M/2×N/2.

According to an exemplary embodiment, a resolution of the 3D image is decreased about ½ with respect to a resolution of the 2D image in a horizontal direction and a vertical direction.

Figure 10:
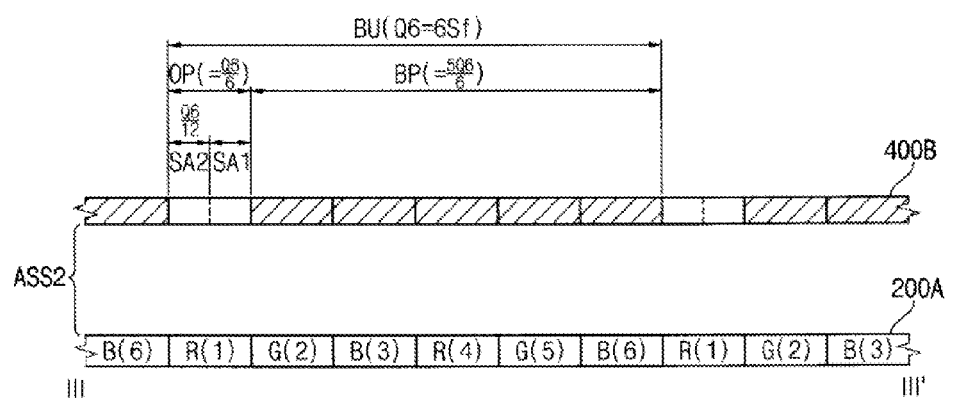
FIG. 10 is a cross-sectional view taken along a line III-III' of FIG. 9.
Figure 11:
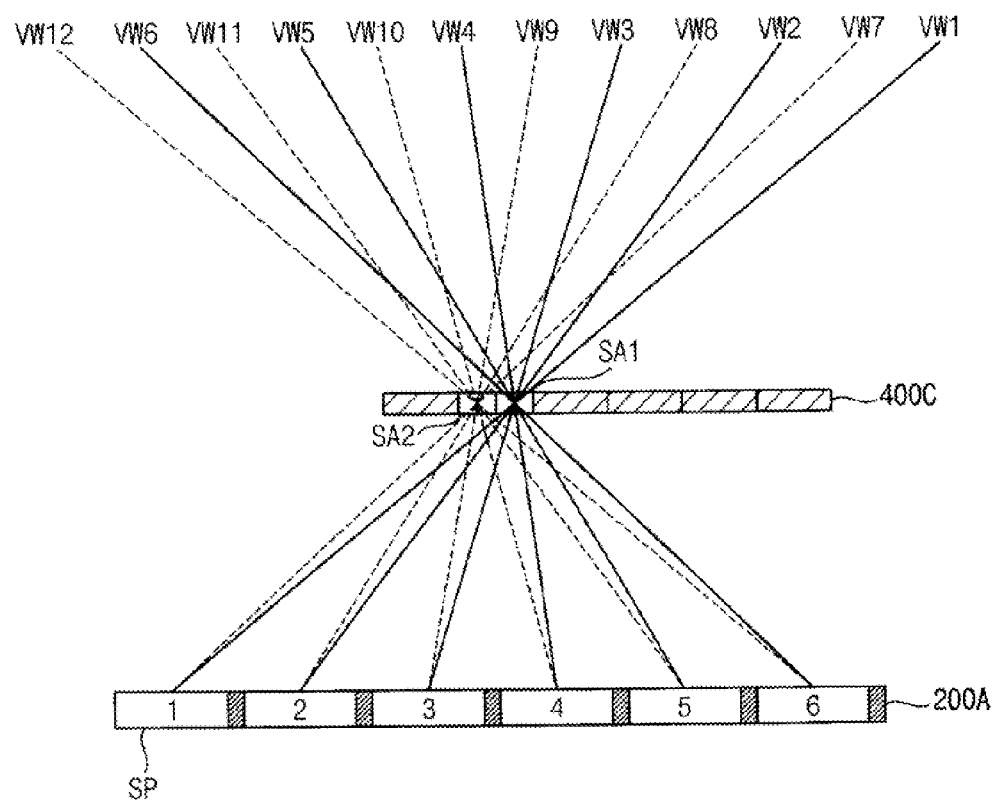
FIG. 11 is a concept diagram schematically illustrating a method of driving a multi-viewpoint image of a panel assembly of FIG. 9.

FIG. 10 is a cross-sectional view taken along a line III-III' of FIG. 9. FIG. 11 is a concept diagram schematically illustrating a method of driving a multi-viewpoint image of a panel assembly such as that shown in FIG. 9.

Referring to FIGS. 10 and 11, the active parallax barrier panel 400B includes a plurality of barrier units BU. The barrier unit BU includes an opening portion OP and a blocking portion BP.

The barrier unit BU has a barrier unit width corresponding five color subpixels (Q5=5Sf). The Sf may be defined by Equation 1 and Equation 2.

The opening portion OP may have a width Q6/6 corresponding to one color subpixel. The blocking portion BP may have a width 5Q6/6 corresponding to five color subpixels. The opening portion OP may have a first sub-area SA1 and a second sub-area SA2. Each of the first and second sub-areas SA1 and SA2 may have a width Q6/12 corresponding to a half of color subpixel SP.

When in the 3D image mode, the opening portion OP of the active parallax barrier panel 400B is time-division driven, so that the first and second sub-areas SA1 and SA2 are selectively opened during one frame interval.

For example, during a first interval of one frame interval, the first sub-area SA1 is operated as the opening portion OP, and the second sub-area SA2 is included in the blocking portion BP. Thus, the first, second, third, fourth, fifth and sixth viewpoint images 1, 2, 3, 4, 5 and 6 displayed on the display panel 200A are provided to the first, second, third, fourth, fifth and sixth viewpoint positions VW1, VW2, VW3, VW4, VW5 and VW6 through the opening portion OP corresponding to the first sub-area SA1. Accordingly, during the first interval, three viewers may view a 3D image.

Then, during a second interval of the frame interval, the first sub-area SA1 is included in the blocking portion BP and the second sub-area SA2 is operated as the opening portion OP. Thus, first, second, third, fourth, fifth and sixth viewpoint images 1, 2, 3, 4, 5 and 6 displayed on the display panel 200A are provided to seventh, eighth, ninth, tenth, eleventh and twelfth viewpoint positions VW7, VW8, VW9, VW10, VW11 and VW12 through the opening portion OP corresponding to the second sub-area SA2. Accordingly, during the second interval, three viewers may view a 3D image.

As a result, the display assembly ASS2 may display twelve viewpoint images during one frame interval, and six viewers may view 3D image.

According to an exemplary embodiment, a resolution of a 3D image may be decreased about ⅓ with respect to a resolution of a 2D image in a vertical direction, and may be decreased about ½ with respect to a resolution of a 2D image in a horizontal direction. Moreover, the active parallax barrier panel 400B for six viewpoints may be time-division driven to display twelve viewpoint images.

Figure 12:
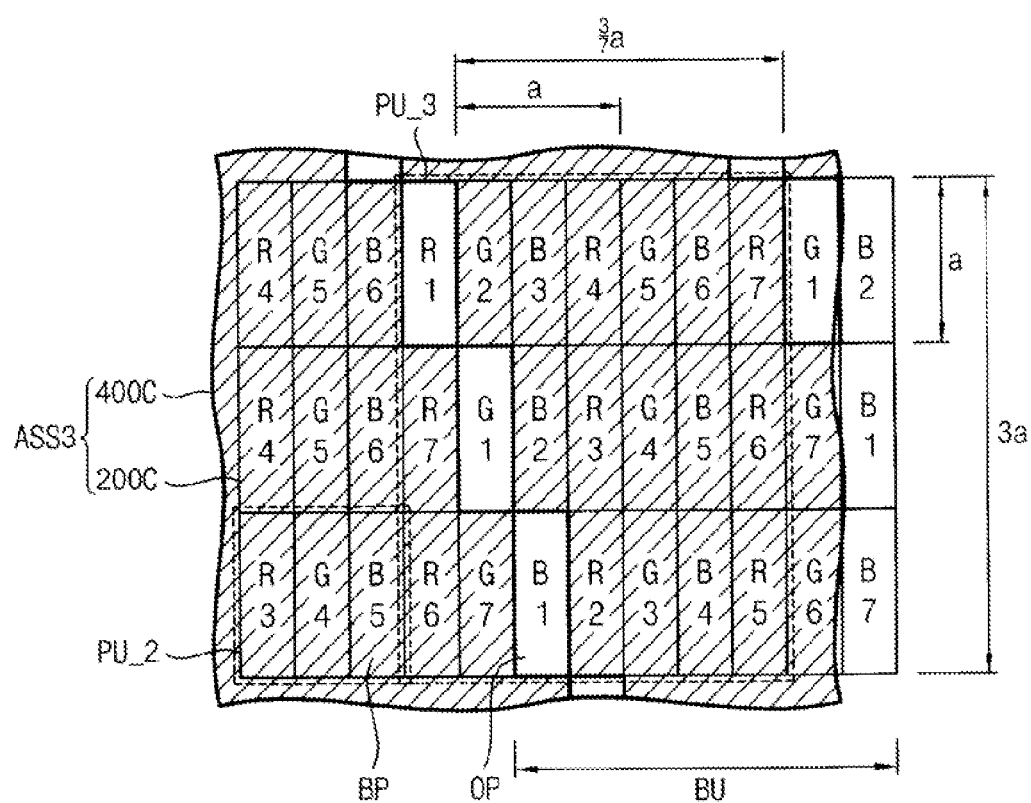
FIG. 12 is a plan view schematically illustrating a panel assembly according an exemplary embodiment of the present invention.

FIG. 12 is a plan view schematically illustrating a panel assembly according an exemplary embodiment of the present invention.

Referring to FIG. 12, the display panel 200C of a panel assembly ASS3 according an exemplary embodiment includes a red subpixel R, a green subpixel G and a blue subpixel B to display seven viewpoint images 1, 2, 3, 4, 5, 6 and 7.

The color subpixels R, G and B are repeatedly arranged along a column direction, and are repeatedly arranged along a row direction. As shown in FIG. 12, seven viewpoint images 1, 2, 3, 4, 5, 6 and 7 are displayed on seven color subpixels that are continuously disposed along a column direction.

The active parallax barrier panel 400C of the panel assembly ASS3 defines a barrier unit BU. The barrier unit BU includes an opening portion OP and a blocking portion BP. The opening portion OP is arranged in an incline direction inclined with respect to a row direction. For example, the active parallax barrier panel 400C has an incline structure.

For example, in the barrier unit BU defined in a first pixel column, the opening portion OP is disposed in correspondence with a red subpixel R displaying a first viewpoint image 1, and the blocking portion BP is disposed in correspondence with green, blue, red, green, blue and red subpixels G, B, R, G, B and R that are continuously disposed along a column direction, which display a second viewpoint images 2, a third viewpoint image 3, a fourth viewpoint image 4, a fifth viewpoint image 5, a sixth viewpoint image 6 and a seventh viewpoint image 7, respectively. In the barrier unit BU defined in a second pixel column, the opening portion OP is disposed in correspondence with a green subpixel G displaying a first viewpoint image 1. The blocking portion BP is disposed in correspondence with blue, red, green, blue and red subpixels B, R, G, B, R and G that are continuously disposed along a column direction, which display a second viewpoint images 2, a third viewpoint image 3, a fourth viewpoint image 4, a fifth viewpoint image 5, a sixth viewpoint image 6 and a seventh viewpoint image 7, respectively. In the barrier unit BU defined in a third pixel column, the opening portion OP is disposed in correspondence with a blue subpixel B displaying a first viewpoint image 1, and the blocking portion BP is disposed in correspondence with red, green, blue, red and green subpixels R, G, B, R, G and B that are continuously disposed along a column direction, which display a second viewpoint images 2, a third viewpoint image 3, a fourth viewpoint image 4, a fifth viewpoint image 5, a sixth viewpoint image 6 and a seventh viewpoint image 7, respectively.

According to the display assembly ASS3 of FIG. 12, when in a 2D image mode, a 2D pixel unit PU_2 corresponding to a pixel unit including red, green and blue subpixels R, G and B displays a 2D image having a resolution of M×N. When in a 3D image, a 3D pixel unit PU_3, which includes red, green and blue subpixels R, G and B displaying identical viewpoint image exposed through the opening portion OP of the barrier unit BU, displays a 3D image having a resolution of 3M/7×N/3.

According to exemplary embodiments, a resolution of the 3D image is decreased about 3/7 with respect to a resolution of the 2D image in a horizontal direction, and is decreased about ⅓ with respect to a resolution of the 2D image in a vertical direction.

Although not shown in FIG. 12, the display assembly ASS3 according to exemplary embodiments may be time-division driven to display fourteen viewpoint images during one frame interval, so that 6.5 viewers may view a 3D image.

According to an exemplary embodiment, a resolution of a 3D image may be decreased about ⅓ with respect to a resolution of a 2D image in a vertical direction, and may be decreased about 3/7 with respect to a resolution of a 2D image in a horizontal direction. Moreover, the active parallax barrier panel 400C for seven viewpoints may be time-division driven to display fourteen viewpoint images.

The following Table 1 shows a resolution decrease ratio of a 3D image corresponding to the number of viewpoints in accordance with exemplary embodiments of the present invention.

TABLE 1

| The number of viewpoints | | 4 | 5 | 6 | 7 | 8 | 9 |
|---|---|---|---|---|---|---|---|
| Resolution | Horizontal | 1/2 | 2/5 | 1/2 | 3/7 | 3/8 | 1/3 |
| | Vertical | 1/2 | 1/2 | 1/3 | 1/3 | 1/3 | 1/3 |

The number of viewpoints of Table 1 represents the number of viewpoints before time-division driving. Referring to Table 1, it is determined that the horizontal resolution of four viewpoints is decreased about 1/2 and the vertical of four viewpoints is decreased about 1/2. Moreover, it is determined that the horizontal resolution of five viewpoints is decreased about 2/5 and the vertical resolution of flee viewpoints is decreased about 1/2. For example, it is determined that the vertical resolution of no more than five viewpoints is decreased about 1/2.

Moreover, it is determined that the horizontal resolution of six viewpoints is decreased about 1/2 and the vertical resolution of six viewpoints is decreased about 1/3. Moreover, it is determined that the horizontal resolution of seven viewpoints is decreased about 3/7 and the vertical resolution of seven viewpoints is decreased about 1/3. Moreover, it is determined that the horizontal resolution of eight viewpoints is decreased about 3/8 and the vertical resolution of eight viewpoints is decreased about 1/3. Moreover, it is determined that the horizontal resolution of nine viewpoints is decreased about 1/3 and the vertical resolution of nine viewpoints is decreased about 1/3. For example, it is determined that the vertical resolution of no more than six viewpoints is decreased about 1/3.

According to exemplary embodiments of the present invention, an active parallax barrier panel is time-division driven to display multi-viewpoint images. Moreover, a pixel structure and a barrier structure are alerted, so that deterioration of a resolution of a 3D image may be minimized.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and aspects of the present invention.

What is claimed is:

1. A method of displaying a three-dimensional ("3D") image, the method comprising:
    displaying n numbers of viewpoint images on a display panel, wherein n is natural numbers greater than 2; and
    during a frame interval, selectively opening m numbers of sub-areas of an opening portion of a barrier unit to provide m numbers of viewpoint images on n×m viewpoint positions,
    wherein m is natural numbers greater than 2, and
    wherein the display panel comprises a pixel unit including a plurality of color subpixels and each of the plurality of color subpixels has a size that is substantially greater than or equal to twice a size of each of the sub-areas of the opening portion of the barrier unit.

2. The method of claim 1, wherein the color subpixels of a given color are arranged in a first incline direction inclined with respect to a row direction.

3. The method of claim 2, wherein the opening portion is arranged in a second incline direction opposite to a horizontal direction with respect to the first incline direction.

4. The method of claim 3, wherein the display panel displays four viewpoint images through four color subpixels that are continuously disposed along a column direction.

5. The method of claim 2, wherein opening portions of the barrier unit are arranged in a delta shape to display five viewpoint images.

6. The method of claim 1, wherein the color subpixels of a given color are arranged along a row direction.

7. The method of claim 6, wherein six viewpoint images of the m number of viewpoint images are displayed on six color subpixels of the plurality of color subpixels that are continuously disposed along a column direction.

8. The method of claim 6, wherein seven viewpoint images of the m number of viewpoint images are displayed on seven color subpixels of the plurality of color subpixels that are continuously disposed along a column direction.

9. A display apparatus comprising:
    a display panel displaying n numbers of viewpoint images, wherein n is natural numbers greater than 2; and
    an active parallax barrier panel comprising a plurality of barrier units, each of the barrier units comprising an opening portion and a blocking area divided into m numbers of sub-areas, the active parallax bather panel selectively opening the m numbers of sub-areas to provide the m numbers of viewpoint images on (n×m) numbers of viewpoint positions, wherein m is natural numbers greater than 2, and
    wherein the display panel comprises a pixel unit including a plurality of color subpixels and each of the plurality of color subpixels has a size that is substantially greater than or equal to twice a size of each of the sub-areas of the opening portion of the barrier unit.

10. The display apparatus of claim 9, wherein the n numbers of viewpoint images are displayed on n numbers of color subpixels that are continuously disposed along a column direction.

11. The display apparatus of claim 9, the color subpixels of a give color are arranged in a first incline direction inclined with respect to a row direction.

12. The display apparatus of claim 11, wherein the opening portion of the active parallax bather panel is arranged in a second incline direction inclined with respect to a row direction.

13. The display apparatus of claim 12, wherein the second incline direction is opposite to the first incline direction with respect to a horizontal direction.

14. The display apparatus of claim 13, wherein the display panel displays four sub-viewpoint images through four color subpixels that are continuously disposed along a column direction.

15. The display apparatus of claim 11, wherein the opening portions of the active parallax barrier panel are arranged in a delta shape to display five viewpoint images.

16. The display apparatus of claim 9, wherein the color subpixels of a given color are arranged along a row direction.

17. The display apparatus of claim 16, wherein six viewpoint images of the n numbers of viewpoint images are displayed on six color subpixels of the plurality of color subpixels that are continuously disposed along a column direction.

18. The display apparatus of claim 16, wherein seven viewpoint images of the n numbers of viewpoint images are displayed on seven color subpixels of the plurality of color subpixels that are continuously disposed along a column direction.

19. A display apparatus comprising:
- a display panel displaying more than two distinct viewpoint images;
- a display driving part for driving the display panel;
- an active parallax barrier panel comprising a plurality of barrier units, each of the barrier units comprising an opening portion and a blocking area divided into a plurality of sub-areas, the active parallax barrier panel configured to selectively open each of the plurality of sub-areas to provide the more than two distinct viewpoint images to provide more than two distinct viewpoint positions for displaying a three-dimensional image; and
- a barrier driving part for driving the active parallax barrier panel,
- wherein the display panel comprises a pixel unit including a plurality of color subpixels and each of the plurality of color subpixels has a size that is substantially greater than or equal to twice a size of each of the sub-areas of the opening portion of the barrier unit.

* * * * *